(No Model.) 2 Sheets—Sheet 1.
D. J. MANNING.
FERTILIZER OR INSECTICIDE DISTRIBUTER.
No. 491,318. Patented Feb. 7, 1893.
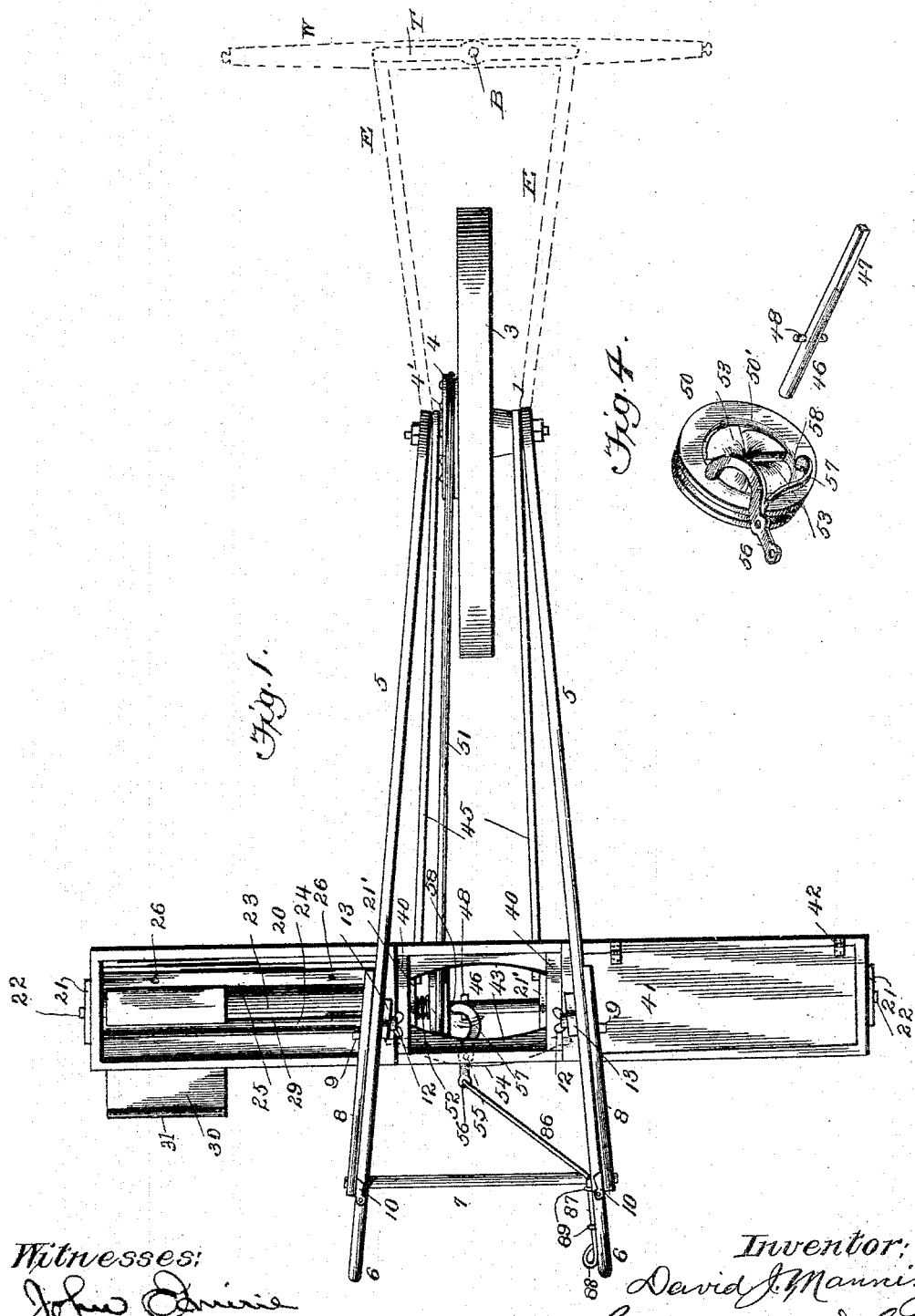
Witnesses:
John Downie
D. E. Squires
Inventor:
David J. Manning,
by Collamer & Co,
Attorneys.

(No Model.) 2 Sheets—Sheet 2.
D. J. MANNING.
FERTILIZER OR INSECTICIDE DISTRIBUTER.
No. 491,318. Patented Feb. 7, 1893.
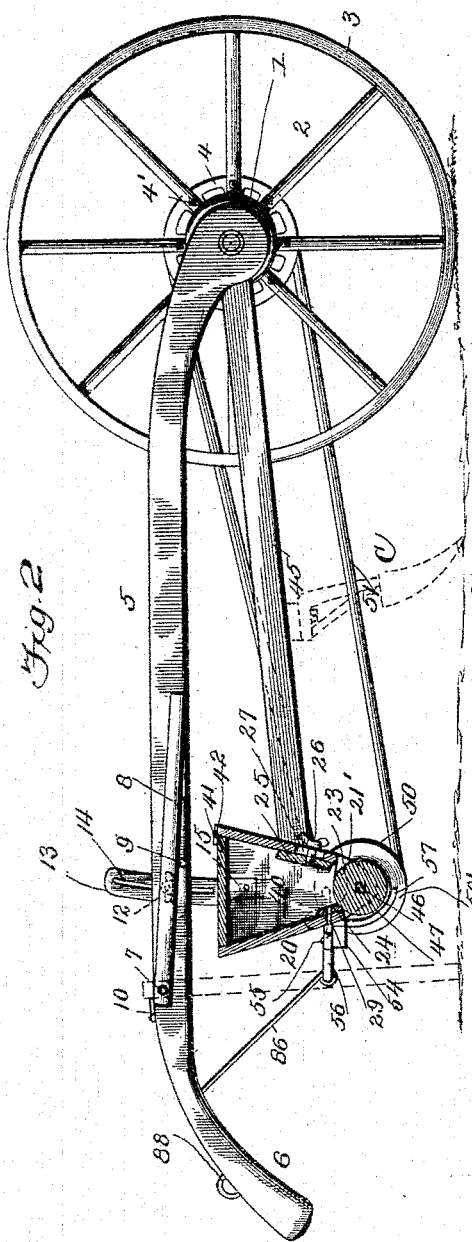
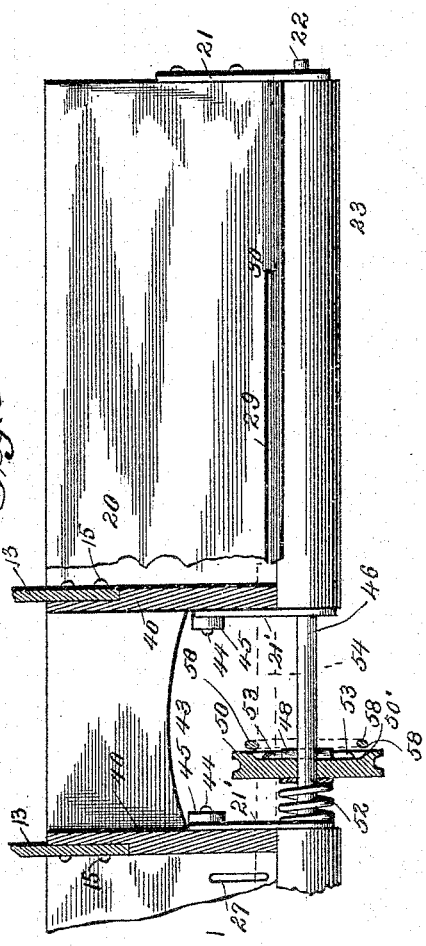
Witnesses:
Inventor:
David J. Manning,
by Collamer & Co.,
Attorneys.

UNITED STATES PATENT OFFICE.

DAVID JACKSON MANNING, OF CHIPPEWA FALLS, WISCONSIN.

FERTILIZER OR INSECTICIDE DISTRIBUTER.

SPECIFICATION forming part of Letters Patent No. 491,318, dated February 7, 1893.

Application filed May 27, 1892. Serial No. 434,613. (No model.)

*To all whom it may concern:*

Be it known that I, DAVID JACKSON MANNING, a citizen of the United States, residing at Chippewa Falls, in the county of Chippewa and State of Wisconsin, have invented certain new and useful Improvements in Insecticide-Distributers; and I do hereby declare the following to be a full, clear, and exact description of the invention, such as will enable others skilled in the art to which it appertains to make and use the same.

This invention relates to seeders or planters, and more especially to that class known as insecticide distributers which are also capable of distributing fertilizer in the shape of a fine powder; and the object of the same is to effect certain improvements in devices of this character.

To this end the invention consists in a machine of substantially the construction hereinafter more fully described and claimed, and as illustrated on the drawings, wherein—

Figure 1 is a plan view of this machine complete, showing one section of the hopper with its cover raised or removed in order to illustrate its internal structure. Fig. 2 is a left side elevation of the machine with the hopper in cross-section—the nearer supporting leg being shown as raised in full lines and down in dotted lines. Fig. 3 is a rear elevation of one end section of the hopper and a central longitudinal section of the other end thereof and, the driving pulley and inner brackets. Fig. 4 is a perspective detail of the driving shaft between the rollers, showing the clutch and the lever for operating it.

In a hub 1 are secured about eight spokes 2 leading to a rim 3, and 4 is a grooved pulley secured as by clips or bolts 4' to one side of the spokes of the wheel around the hub. The axle or ends of the hub are journaled in side bars 5 which extend to the rear and form handles 6, just forward of which they are connected by a rung 7. On the outer ends of this rung are pivoted two legs 8 which, when raised, rest upon suitable stops 9 or upon the top of the hopper as seen in full lines in Fig. 2, and when down (as seen in dotted lines) so as to support the rear end of the machine, are held in position by buttons 10.

12 are thumb nuts taking into the side bars 5 and passing through slots 14 struck around the axle in supports 13 which are secured at their lower ends as at 15 to the hopper.

The hopper 20 is about five feet in length and its front and rear walls converge toward the bottom as shown. Secured to each end of the hopper is a bracket 21 wherein is journaled a pin 22 supporting a roller 23 which stands along the open bottom of the hopper, and within the latter is arranged a deflector 24 standing against the rear wall of the hopper and close above the roller as best seen in Fig. 2.

25 are stop plates or cut offs standing against the front wall of the hopper and rendered vertically adjustable therein by bolts 26 which pass through slots 27 in this wall, so that when these stop plates are adjusted, the slot between the lower edge of the front wall of the hopper and the top of the roller will be regulated in size. Through the rear wall of the hopper and the deflectors are cut slots 29, into which may be inserted cutoffs 30, whereby portions of the hopper bottom may be closed as when it is not desired to use the full length thereof. Obviously these cut-offs may be of greater or less width according to the amount of closing they are intended to accomplish, and their outer edges preferably have handles 31 as shown.

The hopper 20 is provided near the center with two vertical partitions 40 arranged about a foot apart and two feet from the ends of the hopper, so that the latter is divided into two parts, each of which carries a roller 23 as above described and each of which has a cover 41 preferably hinged to its front wall as shown at 42. Between these partitions the front and rear walls of the hopper are cut away as at 43; and pivoted on pins 44 in the inner faces of these partitions are long arms 45 extending forward and journaled on the axle of the hub 1 whereby, when the hopper is raised and lowered by its adjustable supports 13, it will always be held at the same distance from the center of the main wheel.

46 is a shaft journaled in brackets 21' carried by the partitions 40, and through this shaft is a pin 48 as seen in Fig. 4. Said figure shows but one end of the shaft, though both ends thereof are squared as at 47 where they are seated in the inner ends of the rollers 23.

50 is a grooved pulley journaled loosely on the shaft 46 and connected by a belt 51 with the drive pulley 4 on the main wheel 3, and 52 is a spring here shown at the left of this pulley 50 and bearing it toward the pin 48 as seen in Fig. 3. The right face of this pulley has a clutch composed of a number of beveled wings 53 adapted—as will be clear—to engage the pin 48 when the spring throws them into connection therewith. 54 is a bracket carried by the rear wall of the hopper, and on a pivot pin 55 in this bracket is pivoted a lever 56 whose inner end is forked as shown at 57 and rests at the extremity 58 of its forks against the smooth face 50' of the pulley 50 outside of the wings 53. From the other arm of this lever a cord, chain, or wire 86 leads to the rear through an eye in one of the handles or is connected with a bolt 87 provided with a ring or handle 88 and moving in staples 89 in the handle 6, the ring 88 standing in position to be engaged by the operator's finger when his hand grasps this handle. When this ring is drawn on, the lever 56 is turned on its pivot 55 so as to move the pulley 50 out of engagement with the pin 48. Thereafter the movement of this pulley by the belt 51 will not turn the rollers. I have shown in dotted lines in Fig. 1 a device which I may use when it is desired to attach a horse to this machine. In this case the side bars 5 are continued forward as at E beyond the main axle and are connected by a transverse bar T standing in front of the main axle, and W is a whiffle tree pivotally connected as by a bolt B with the center of the bar T. I have also shown in dotted lines in Fig. 2 how a cultivator C might be attached to and supported by the arms 45 between the wheel and the hopper, and when so constructed the cultivator would operate in advance of the distribution of the insecticide or fertilizer. As the wheel travels between the rows, so would the cultivator, and by suitably adjusting the cut-offs 30, the hopper could be caused to feed the insecticide directly upon the rows or hills. These and various other additions to, and changes in the details of construction of, my machine as above described, might be made without departing from the essential principles of the invention.

The operation of this improved machine is as follows: The material in a dry powdered state is placed in the two sections of the hopper, the stop plates being adjusted to permit it to pass out as rapidly as desired, and the cut-offs inserted to close either or both ends of the hopper-bottom if it is not desired to sift the full width of the machine. The supports 13 are then adjusted to raise the hopper from the ground according to the height of the operator's hands from the ground, and the height of the tops of the potatoes or plants to be treated—it being desirable that the hopper shall just clear such tops as will be understood. The operator then grasps the handles and pushes the machine in front of him passing the wheel between the rows of plants, and when it is desired to sift or feed powder thereon he releases the ring 88 and the spring 52 engages the pulley 50 with the pin 48. The shaft 46 is then rotated by this pulley and the rollers 23 are caused to turn in the proper direction to pass the powder out of the hopper beneath the stop plates 25. To stop this movement the ring may be pulled on so that the clutch between the pulley and the pin is disconnected. From time to time the hopper is refilled, and the cover thereof will prevent the agitated powder from rising into the face of the operator. When powdered paris green, london purple, or other poison is applied broadcast, it gets into the eyes with injurious effects, and the wind that may be blowing prevents the even distribution thereof. These evils it is the intention of this invention to cure, at the same time affording various adjustments necessary and desirable.

What is claimed as new is—

1. In a machine of the class described, the combination with the main wheel, a pulley secured thereto, and side bars mounted on the axle of said wheel and having handles at their rear ends; of a hopper, arms connected with the hopper and journaled on the axle, supports secured to the hopper and having slots struck around said axle, set screws through said slots into the side bars, a feeder within the hopper, and a belt leading from said pulley to the feeder, as and for the purpose set forth.

2. In a machine of the class described, the combination with the main wheel, a pulley secured thereto, and side bars mounted on the axle of said wheel and having handles at their rear ends; of a hopper, arms connected with the hopper and journaled on the axle, supports secured to the hopper and adjustably connected with the side bars, a feed roller journaled below and adjacent the mouth of the hopper, a pulley connected with this roller, and a belt connecting the pulleys, as and for the purpose set forth.

3. In a machine of the class described, the combination with the main wheel, a pulley secured thereto, and side bars mounted on the axle of said wheel and having handles at their rear ends; of a hopper standing across and beneath the side bars, two vertical partitions within and near the center of the hopper between which partitions its walls are cut away, arms connected with the partitions and journaled on the axle, supports secured to the partitions and adjustably connected with the side bars, brackets depending from the partitions and ends of the hopper, two rollers whose shafts are journaled in said brackets, a pulley on the shaft between the partitions, and a belt connecting the pulleys, as and for the purpose set forth.

4. In a machine of the class described, the combination with the main wheel, a pulley secured thereto, and side bars mounted on the axle of said wheel and having handles at their rear ends; of a hopper standing across and beneath the side bars and supported thereby, two vertical partitions within and near the center of the hopper between which partitions its walls are cut away, brackets depending from the partitions and ends of the hopper, rollers below and adjacent the mouths of the hopper sections, pins in the outer ends of the rollers journaled in the outer brackets, a shaft journaled in the inner brackets and having squared ends seated in the rollers, a pulley on this shaft, and a belt connecting the pulleys, as and for the purpose set forth.

5. In a machine of the class described, the combination with the main wheel, a pulley secured thereto, and side bars mounted on the axle of said wheel and having handles at their rear ends; of a hopper standing across and beneath the side bars and supported thereby, two vertical partitions within and near the center of the hopper between which partitions its walls are cut away, brackets depending from the partitions and ends of the hopper, rollers below and adjacent the mouths of the hopper sections, pins in the outer ends of the rollers journaled in the outer brackets, a shaft journaled in the inner brackets and having squared ends seated in the rollers, a pulley mounted loosely on this shaft, a clutch between this pulley and shaft, a tripper for the clutch extending through the rear wall of the hopper where cut away and to within reach of the operator, and a belt connecting the pulleys, as and for the purpose set forth.

6. The herein described hopper having converging walls, vertical partitions in the hopper near its center and between which said walls are cut away, brackets on the partitions and ends of the hopper, rollers below and adjacent the mouths of the hopper-sections, pins in the outer ends of the rollers journaled in the outer brackets, a shaft journaled in the inner brackets and seated in the inner ends of the rollers, a pulley mounted loosely on the shaft, a clutch between the pulley and shaft, a spring normally engaging the clutch members, a bracket carried by the rear wall and at the center of the hopper, a lever pivoted on a pin in this bracket and having a forked inner end bearing against the smooth face of the pulley outside its clutch, and a tripper leading from the outer end of the lever to within reach of the operator; combined with a hopper-support mounted on a wheel, a pulley carried by the wheel, and a belt connecting the pulleys, as and for the purpose set forth.

7. The herein described hopper having converging walls, vertical partitions in the hopper near its center and between which said walls are cut away, brackets on the partitions and ends of the hopper, rollers below and adjacent the mouths of the hopper-sections, pins in the outer ends of the rollers journaled in the outer brackets, a shaft journaled in the inner brackets and seated in the inner ends of the rollers, a pulley mounted loosely on the shaft, a clutch between the pulley and shaft, a spring normally engaging the clutch members, a bracket carried by the rear wall and at the center of the hopper, a lever pivoted on a pin in this bracket and having a forked inner end bearing against the smooth face of the pulley outside its clutch, a bolt sliding in guides and having a ring handle, and a rod connecting the bolt with the outer end of said lever; combined with a hopper-support mounted on a wheel, a pulley carried by the wheel, and a belt connecting the pulleys, as and for the purpose set forth.

8. The herein described hopper having converging walls, vertical partitions in the hopper near its center and between which said walls are cut away, brackets on the partitions and ends of the hopper, rollers below and adjacent the mouths of the hopper-sections, pins in the outer ends of the rollers journaled in the outer brackets, a shaft journaled in the inner brackets and seated in the inner ends of the rollers, a pin through said shaft, a pulley mounted loosely on the shaft and having beveled wings, a spring throwing the wings into engagement with the pin, a bracket carried by the rear wall and at the center of the hopper, a lever pivoted on a pin in this bracket and having a forked inner end bearing against the smooth face of the pulley outside said wings, and a tripper leading from the outer end of the lever to within reach of the operator; combined with a hopper-support mounted on a wheel, a pulley carried by the wheel, and a belt connecting the pulleys, as and for the purpose set forth.

9. The herein described hopper having converging walls, vertical partitions in the hopper near its center and between which said walls are cut away, brackets on the partitions and ends of the hopper, rollers below and adjacent the mouths of the hopper-sections, pins in the outer ends of the rollers journaled in the outer brackets, a shaft journaled in the inner brackets and seated in the inner ends of the rollers, deflectors against the rear walls of the hopper-sections, stop plates against their front walls, bolts in said plates extending through slots in said walls, and a pulley on said shaft; combined with a hopper-support mounted on a wheel, a pulley carried by the wheel, and a belt connecting the pulleys, as and for the purpose set forth.

10. The herein described hopper having converging walls, vertical partitions in the hopper near its center and between which said walls are cut away, brackets on the partitions and ends of the hopper, rollers below and adjacent the mouths of the hopper-sections, pins in the outer ends of the rollers journaled in the outer brackets, a shaft journaled in the inner brackets and seated in the inner ends of the rollers, deflectors against the rear walls of the hopper-sections, stop plates against their front walls, bolts in said plates extending through slots in said walls, the rear walls and deflectors being slotted, cut-offs removably inserted in said slots, a pulley on said shaft, a clutch between the pulley and shaft, and means for operating the said clutch; combined with a hopper-support mounted on a wheel, a pulley carried by the wheel, and a belt connecting the pulleys, as and for the purpose hereinbefore set forth.

In testimony whereof I affix my signature in presence of two witnesses.

DAVID JACKSON MANNING.

Witnesses:
GEO. P. JENKINS,
W. W. JENKINS.